R. A. McCLURE AND W. W. BOULTON.
DRIVING APPARATUS FOR MONORAIL TRUCKS.
APPLICATION FILED NOV. 9, 1917.

1,345,867. Patented July 6, 1920.

WITNESSES:
F. C. Matheny
R. J. Cook

INVENTOR
ROYAL A. McCLURE
AND
WILLIAM W. BOULTON
BY
Cook & Matheny
ATTORNEYS

UNITED STATES PATENT OFFICE.

ROYAL A. McCLURE AND WILLIAM W. BOULTON, OF SEATTLE, WASHINGTON, ASSIGNORS TO UNIVERSAL ELEVATED RAILWAY COMPANY, OF SEATTLE, WASHINGTON.

DRIVING APPARATUS FOR MONORAIL-TRUCKS.

1,345,867.        Specification of Letters Patent.     Patented July 6, 1920.

Application filed November 9, 1917. Serial No. 201,174.

*To all whom it may concern:*

Be it known that we, ROYAL A. MCCLURE and WILLIAM W. BOULTON, citizens of the United States, residing at Seattle, in the county of King and State of Washington, have invented a new and useful Improvement in Driving Apparatus for Monorail-Trucks, of which the following is a specification.

This invention relates to improvements in driving mechanism for railway cars of the single rail type, and the object of this improvement is to provide a strong, simple and efficient driving mechanism for a single rail car truck of the type illustrated and described in copending application Serial No. 149,966, of ourselves and Henry R. Stevens, filed February 20th, 1917.

Further and more specific objects are to provide a driving mechanism for a single rail truck whereby the weight of the motor may be balanced in the center of the truck, and a simple and efficient gear mechanism used to transmit power from a high speed motor to the truck wheel.

The invention consists in the novel construction, adaptation and combination of parts as will be more clearly hereinafter described and claimed.

Figure 1:
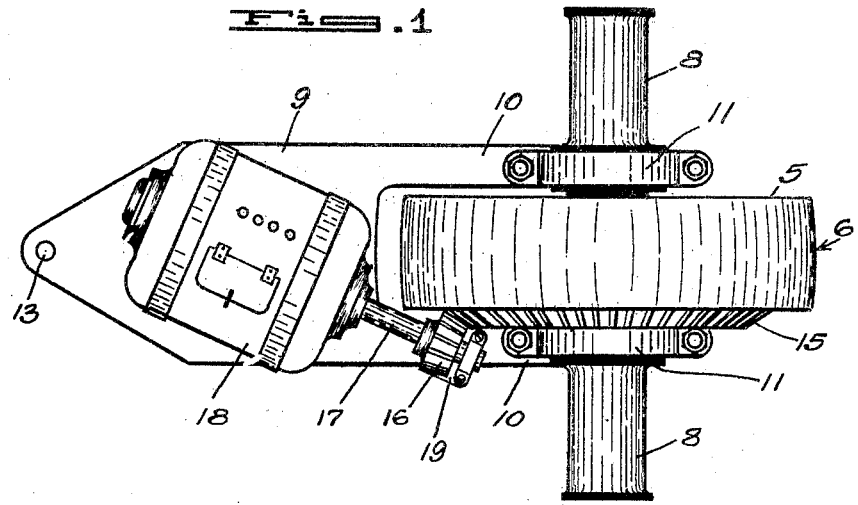
Figure 2:
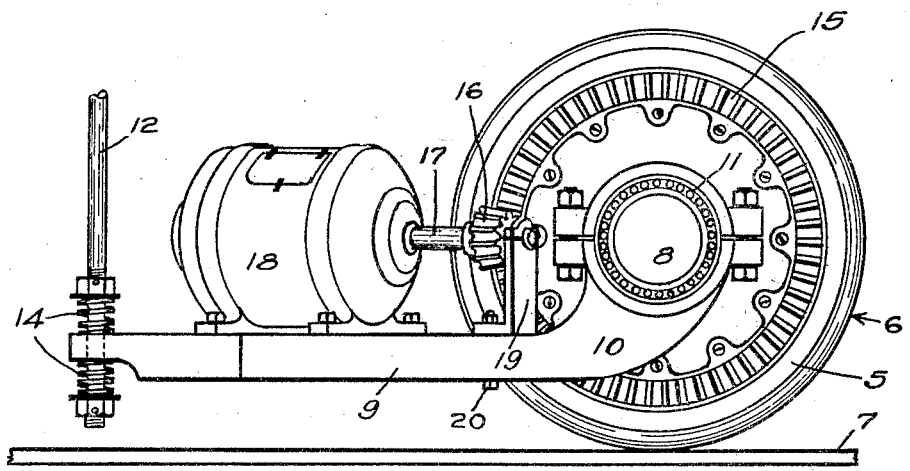

In the accompanying drawings Figure 1, is a plan view of a truck wheel and driving apparatus embodying this invention as it may appear when detached from the truck and Fig. 2 is a view in side elevation of the same.

In the application hereinbefore referred to the motor is contained within the truck wheel. This is found to be very satisfactory for high speed work but where heavy loads are to be moved or steep grades are to be climbed it is necessary to interpose a gearing of some form between the motor and the truck wheel in order that a high speed motor may be used to produce a slow or medium speed drive.

It is also necessary in the construction of a single rail car that the weight of the truck and motor be evenly balanced. The present invention accomplishes these objects.

Referring to the drawings, throughout which like reference numerals indicate like parts, the numeral 5 indicates a truck wheel having a rounded peripheral surface 6 and adapted to run upon a single rail 7.

The wheel 5 is provided with suitable bearings or axles 8 that are journaled in and support a truck frame (not shown).

9 is a platform that is bifurcated or forked at one end to form side bars 10 that are connected with the axles 8 by roller or ball bearings 11 which support one end of the platform, while the other end of the platform is supported by a bar or rod 12 that is connected with the truck frame, the rod 12 passing through a hole 13 in the forward end of the platform and the end of the platform being interposed between two compression springs 14 on the rod so that the platform will not be held rigid, but will have a slight resilience.

15 is a bevel gear disposed on the end of the wheel 5 and adapted to be engaged by a pinion 16 on the shaft 17 of a motor 18 that is mounted on the platform 9.

As will be seen in Fig. 1, the axis of the motor is disposed at an angle to the plane of the wheel 5 so that the weight of the motor may be balanced in the center of truck.

The outer end of the motor shaft is journaled in a bearing bracket 19 that is adjustably secured to the platform 9 by bolts 20.

The bevel gear 15 on the end of the motor wheel 5 may be removably secured thereto so that it may easily be replaced in case it becomes worn or broken.

The gear ratio between the wheel 5 and motor 18 may be varied by substituting pinions 16 of varying sizes on the shaft 17.

As will be seen in Fig. 2, the platform 9 when it moves with respect to the wheel 5 will turn about the same axis that forms the center of the bevel gear 15 thus any movement of the platform with respect to the truck wheel will not disturb the engagement of the pinion 16 with the gear 15.

The springs 14 admit of a slight movement of the motor shelf 9 so that when the motor is started quickly, it will have a slight resiliency or elasticity and will not start the wheel with a jerk.

In the usual form of construction of cars of the type described one of the truck wheels 5 is used at each end of the car. In such cases the motors may be set so that the front motor is geared to one side of its wheel, while the rear motor is geared to the opposite side of its wheel, thus giving the car a perfect balance.

It is obvious that minor changes in the form of construction of the device herein disclosed may be resorted within the scope of the appended claims.

What we claim and desire to protect by Letters Patent is:—

1. The combination with a truck wheel of the class described, of a motor disposed with its center of gravity in the plane of said wheel and its driving shaft at an angle to the plane of said wheel, and means connecting said wheel and said drive shaft for rotating said wheel.

2. The combination with a truck wheel of the class described, of a motor disposed with its center of gravity in the plane of said wheel and its driving shaft at an angle to the plane of said wheel and bevel gears connecting said wheel and said driving shaft.

3. The combination with a truck wheel of the class described, of a platform having one end pivotally supported on the axis of said wheel, a motor secured to said platform with its center of gravity in the plane of said wheel and its driving shaft at an angle to the plane of said wheel, and gearing connecting said driving shaft and said wheel for driving the latter.

4. The combination with a truck wheel having laterally projecting axles, of a bevel gear on one side of said truck wheel concentric with said axles, a platform bifurcated to straddle said wheel, bearings connecting the bifurcated ends of said platform with said axles, resilient means supporting the outer end of said platform, a motor adjustably secured to said platform with its axis at an angle to the plane of said wheel and its center of gravity in the plane of said wheel, a motor shaft in said motor, a bearing for said motor shaft adjustable on said platform, and a pinion on said shaft to engage with said bevel gear and drive said wheel.

The foregoing specification signed by me at Seattle, Washington, this 11th day of May, 1917.

ROYAL A. McCLURE.

Witnesses:
R. J. COOK,
F. C. MATHENY.

The foregoing specification signed by me at Vancouver, B. C., this 10th day of May, 1917.

WILLIAM W. BOULTON.

Witness:
LEON J. LADNER.